June 21, 1927.

J. K. ROBINSON, JR 1,633,036

MULTICELL BATTERY BOX MOLD

Original Filed Jan. 16, 1926    2 Sheets-Sheet 1

Inventor
J. K. Robinson, Jr.

By Clarence A. O'Brien

Attorney

June 21, 1927.
J. K. ROBINSON, JR
1,633,036
MULTICELL BATTERY BOX MOLD
Original Filed Jan. 16, 1926    2 Sheets-Sheet 2
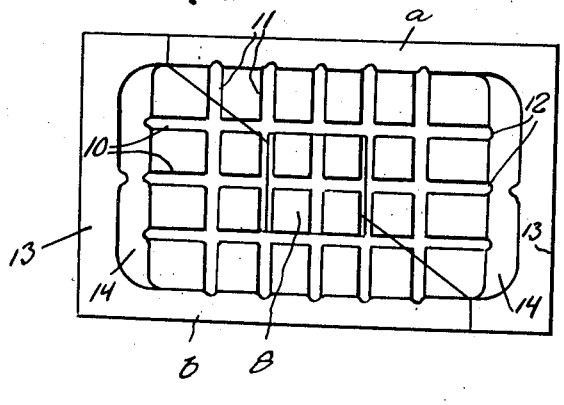
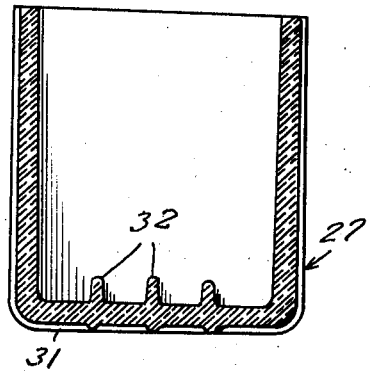
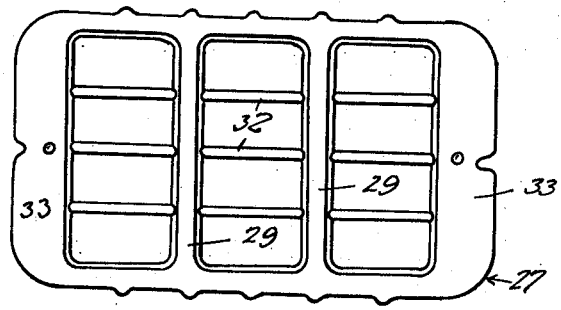
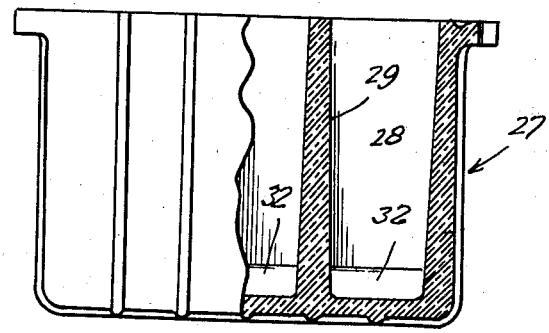
Inventor
J. K. Robinson, Jr.
By Clarence A. O'Brien
Attorney Patented June 21, 1927.

1,633,036

UNITED STATES PATENT OFFICE.

JAMES K. ROBINSON, JR., OF ALTOONA, PENNSYLVANIA.

MULTICELL-BATTERY-BOX MOLD.

Original application filed January 16, 1926, Serial No. 81,763. Divided and this application filed October 19, 1926. Serial No. 142,635.

This invention relates to an improved mold or die structure for making a new type of multi-cell glass battery box of the type used as a portable storage battery for automobiles and the like.

Before discussing the features and advantages, attention is first directed to the fact that the present application is a division of an application covering the battery box per se, and identified by Serial No. 81,763, filed on January 16, 1926.

For clearness, both the battery box and the mold are described in detail in this case, in order that the advantages and features of the mold will be more readily appreciated. However, no claims are entered herein for the battery box.

Briefly, the improved mold comprises a special female section of box-like formation, and a complemental male member made up of a special carrying head, a support therefor and assembling and retaining means for the core blocks, or members.

An outstanding feature of construction is the female part which has an opening in its bottom through which an ejector operates for removing the finished products, this part being formed with intersecting rib forming grooves on its interior and being composed of readily separable sections.

An equally important feature of the invention is the male member comprising a special head, means for connecting it to an operating member, and an arrangement of air cooling pipes associated with said head.

A further feature of construction is the provision of supporting bolts on downturned end portions of the head for maintaining the core blocks in assembled relation.

A further feature of construction is in the use of core members of duplicate design, facilitating manufacture and having the added advantage of interchangeability.

Other objects and advantages of the invention will become apparent from the following description and drawings.

In the accompanying drawings forming a part of this application, and in which like numerals are employed to designate like parts throughout the same:

Figure 5 is a top plan view of the female die unit.

Figure 6 is a similar view of the battery box molded from glass through medium of the present mold construction.

Figure 7 is a view partly in side elevation and partly in cross section of the battery box, and Figure 8 is a vertical transverse section of the same.

Figure 1:
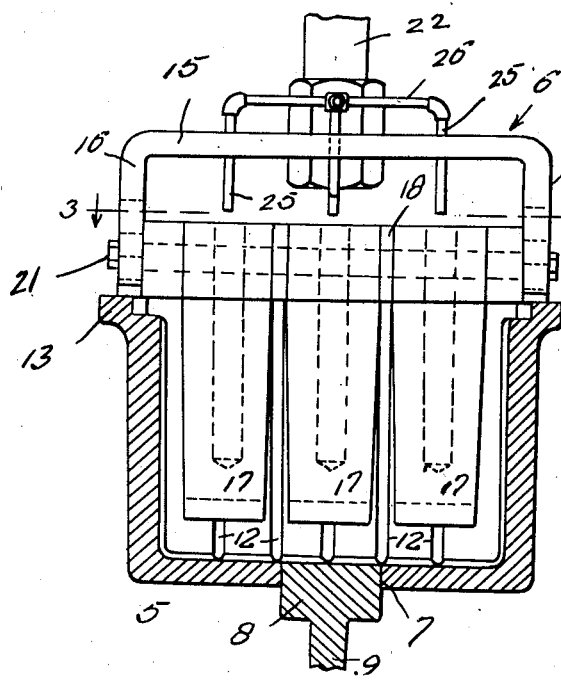
Figure 1 is a view showing the male and female dies of the mold construction in united relation, the female die being shown in cross section, while the male die is disclosed in side elevation.
Figure 2:
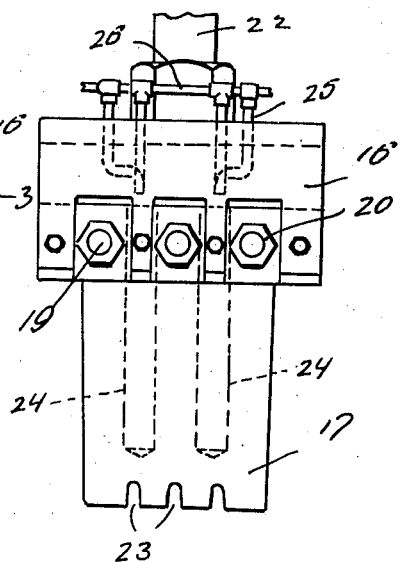
Figure 2 is an end elevation of the male die member.
Figure 3:
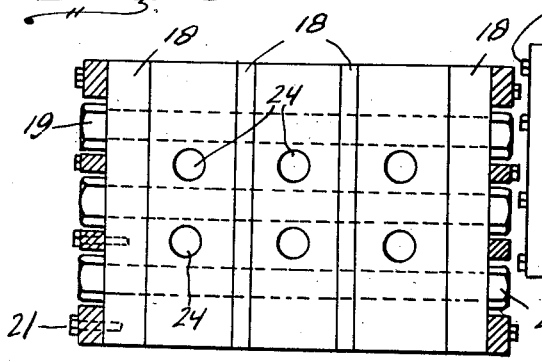
Figure 3 is a longitudinal section taken substantially upon the line 3—3 of Figure 1, and looking downwardly in the direction of the arrows for more clearly disclosing the male die unit assembly.
Figure 4:
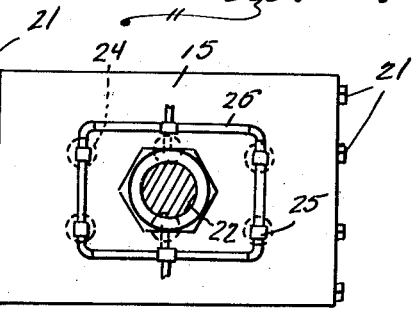
Figure 4 is a top plan view of the male die, the carrying bag therefor being disclosed in cross section.

First having reference to Figures 1 to 5, inclusive wherein is disclosed the battery box molding unit comprising generally a female unit 5, and a male unit 6. The female unit 5 of suitable metal is of rectangular box-like configuration formed from a pair of half sections $a$ and $b$ of the shape as clearly shown in Figure 5, and the sections being interconnected in any desirable manner.

Within the center of the bottom wall of the assembled female unit is a relatively square opening 7 into which extends the head 8 of a battery box ejecting die plunger 9 operated by compressed air or any other suitable medium for projection upwardly through the die for obvious partially ejecting the molded battery box from the die member after the molding operation has been completed, and the male member removed.

The interior of the female unit is formed upon its bottom wall with longitudinally and transversely spaced channels 10 and 11 respectively, the inner face of the head 8 of the die plunger being formed with complementary channels as clearly shown in Figures 1 and 5.

Communicating with the cross channels in the bottom wall of this die unit are spaced vertical channels 12 upon the inner surfaces of the side and end walls of the female die unit, the upper edges of the end walls of which are formed with outwardly extending flanges 13—13, the inner edges of which extend above the ends of said walls for providing rabbets 14—14.

The male die unit 6 constitutes the provision of a rectangular shaped head plate 15, the opposite ends of which are provided with pendent flanges 16—16, Figure 1, between which the cell forming members 17 are adapted to be secured in spaced relation and pendent from said head plate.

Said cell forming members 17 are maintained in spaced relation from each other and from the flanges 16—16 of the head plate 15 through the medium of spacing strips 18, disposed at the extreme upper ends of the cell forming members. Said spacing members and the cell forming members are formed with registering openings that provide longitudinally extending bores for the reception of relatively elongated headed bolts 19 that are adapted to receive at their unheaded but threaded ends, locking nuts 20.

The flanges 16—16 upon opposite ends of the head plate 15 are suitably slotted for permitting of the proper positioning of the bolts 19 and nuts 20. The strips presented by the slotting of the flanges are secured to the end spacing members by set screws 21 as more clearly disclosed in the longitudinal sectional view, Figure 3.

The head plate 15 is centrally attached to a plunger rod 22 that may be, and preferably is, machine actuated in order that the male die may be positioned within and removed from the female die 5.

The length of the cell forming members 17 are such that the lower ends thereof will be in spaced relation from the bottom wall of the female unit 5 when the male unit is disposed entirely within said female unit for providing the bottom wall of the battery box which according to the present invention is molded of glass. Furthermore, the sides of these cell forming members 17 are beveled, as clearly disclosed in Figure 1, for providing tapered end walls in the resultant box as well as tapered partition and side walls for the purpose of adding strength to said walls and for the added purpose of permitting the ready withdrawal of the male unit from the female unit after the box forming material has been properly hardened.

The lower edges of the cell forming members 17 are formed with spaced transversely extending channels 23, while each cell forming member is provided throughout the major portion of its length with two or more circular air chambers 24 that open at the upper ends of the members and into which a charge of air is to be projected for cooling the same and expediting the hardening of the box forming material.

Projecting through the head plate 15 of the male die unit are pipe sections 25, the lower ends of which terminate in spaced alinement with the air chambers 24 of the cell forming members 17 of said male die unit, while the upper ends thereof are in intercommunication through reason of a pipe line 26 that has communication in an obvious manner with a source of air supply.

It will thus be seen that through the employment of a mold construction as previously described, a one piece glass battery box 27, Figures 6, 7 and 8, will be constructed, and will include a plurality of oblong cells 28, the partition walls 29 of which will be tapered as will also the end walls 30 of said box.

Furthermore, the entire exterior surface of the box will be provided with reinforcing ribs 31 together with the ribs 32 at the bottom of each cell 28. Through reason of the rabbet 14—14 in the female die unit 5 carrying flanges 33—33 will be present at opposite ends of the box at the upper edge thereof, all of which figures serve to provide a highly efficient and strong multi-cell battery box adapted to be employed as a jar or container for battery elements necessary in the assembly of storage batteries for use in automobiles and the like.

From the foregoing description and drawings it will be seen that I have evolved and produced a structure wherein the features of the mold constitute the part upon which emphasis is to be placed. The structure is characterized by simplicity, convenience and compactness, ease of manufacture and assembly, and exceptional efficiency in operation. It is believed that by carefully considering the description in connection with the drawings, a clear understanding of the invention will be had. Consequently a more lengthy description is thought unnecessary.

It is desired that certain modifications in the mold unit may be allowed in order that slight departures may be had from the particular construction of formation of battery box constructed in accordance with the present invention.

Having thus described my invention, what I claim as new is:—

1. A mold for forming a battery box of the type specified, comprising a female unit of box-like configuration, said unit being made up of duplicate half sections, being provided at the center of its bottom with an opening for passage of an ejector, being provided at its top with an outstanding flange having recesses, and a male unit adapted for insertion into said female unit, said male unit comprising a head plate having downturned end portions disposed over said flanges and formed with longitudinally spaced notches, a plurality of downwardly tapered core members having vertical bores opening through their tops, spacing elements arranged between said cores and between the down turned portions of said plates for maintaining said cores in spaced relation, means fastening the end spacing members to said downturned plate ends, bolts extending through said spacing members and through said cores, and an assembly of piping including depending branches extending down through said head plate and terminating in alinement with said bores.

2. In a mold of the class described, a female unit of box-like configuration, and a male unit adapted for insertion into said female unit, said male unit comprising a head plate having downturned end portions, a plurality of downwardly tapered core members supported in spaced relation between the downturned end of said plate, said core members having vertical bores opening through their tops, and an assembly of piping connected to said head plate and including depending branches extending down through said head plate and terminating in spaced alignment with said bores.

3. A mold for forming a battery box of the type specified and comprising a female unit of box like configuration, and a male unit adapted for insertion into said female unit, said male unit comprising a head plate having downturned end portions disposed to rest upon the upper ends of said walls of said female unit, the downturned ends being formed with longitudinally spaced notches, a plurality of downwardly tapered core members, located beneath the bight portion of the plate and between the downturned ends, spacing elements arranged between said cores and also between the downturned portions of said plates for maintaining said cores in spaced relation, means fastening the end spacing members to said downturned plate-ends, connecting supporting bolts extending through the spacing members, core members, and notches in the downturned plate ends, and supporting and operating means connected to the central portion of said plate.

In testimony whereof I affix my signature.

JAMES K. ROBINSON, Jr.